(No Model.)
W. HAMMER.
CULTIVATOR.
No. 493,707. Patented Mar. 21, 1893.
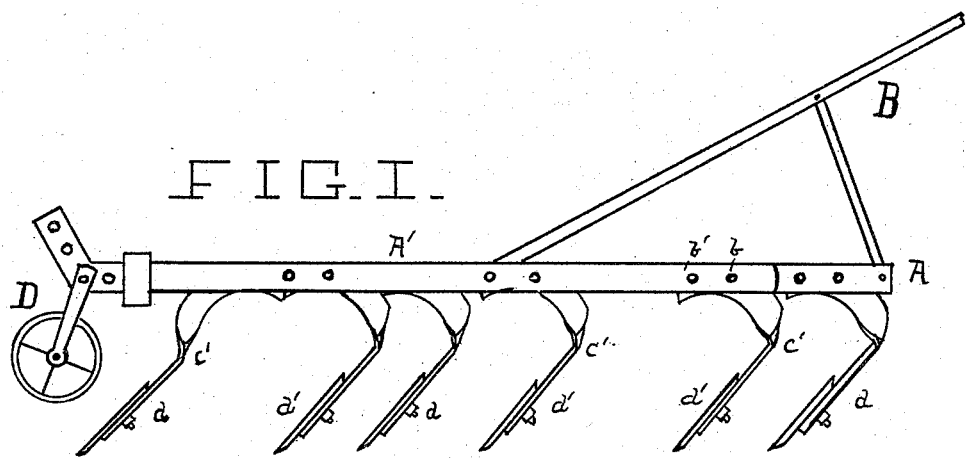
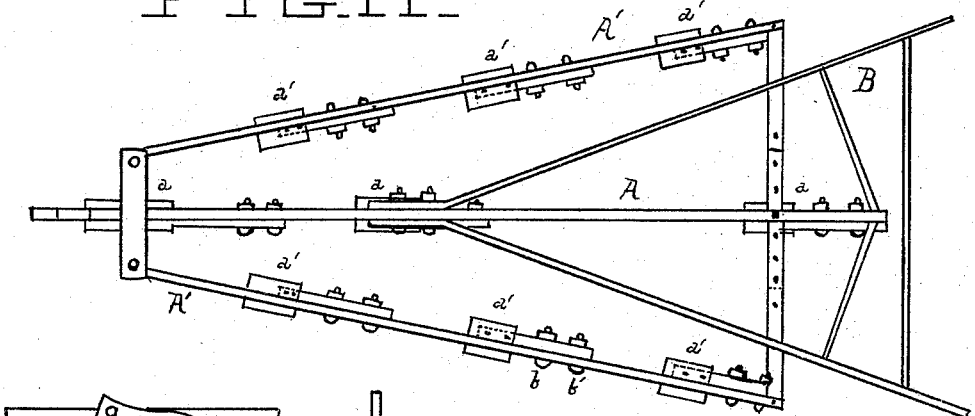
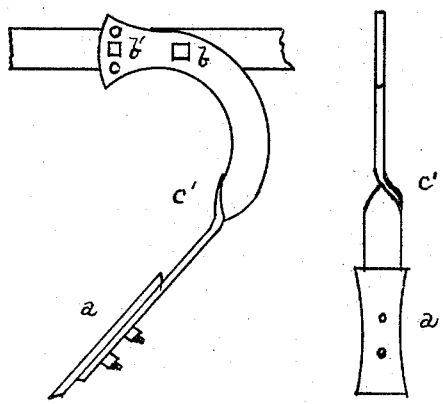
Witnesses.
W. E. Calhoun.
Lelia Boynton.
Inventor.
William Hammer
by W. L. Fay his atty

United States Patent Office.

WILLIAM HAMMER, OF ELYRIA, OHIO.

CULTIVATOR.

SPECIFICATION forming part of Letters Patent No. 493,707, dated March 21, 1893.

Application filed August 3, 1892. Serial No. 442,025. (No model.)

*To all whom it may concern:*

Be it known that I, WILLIAM HAMMER, a citizen of the United States, residing at Elyria, in the county of Lorain and State of Ohio, have invented a new and useful Cultivator, of which the following is a specification.

My invention relates to improvements in walking cultivators for stirring the earth and destroying weeds between rows of crops and the object of my invention is to provide a cultivator that will be more efficient, with lighter draft and more easily handled by the operator than those in ordinary use, besides being cheap and simple in construction.

My improvement consists in the form of teeth used and their arrangement on the frame in relation to each other.

I attain the objects sought by means of the mechanism illustrated in the accompanying drawings.

Figure I. is a side elevation of my invention. Fig. II. is a plan view of same and Fig. III. is an enlarged side and front view of one of the teeth.

Similar letters refer to similar parts throughout the several views.

A represents the central bar of my frame and A' A' side bars or wings of same. B represents broken section of handles secured to the central bar A of the frame.

$a, a, a,$ represent three teeth secured to the central bar of said frame and substantially in line with each other and $a', a', a',$ represent three teeth secured to each of the side bars. By reason of having the three teeth on the central bar and in line, the rear two tend to run in the same cut made by the first one and on this account the machine in rough and lumpy or hard ground is more easily kept in a straight course and does not jump around as much as is common with this class of implements under similar circumstances. Further the soil is better loosened and the weeds more thoroughly destroyed.

The teeth are made of a piece of ordinary flat bar iron or steel bent into the desired form and may be provided with a separable point or not as desired. The bar of which the teeth are formed is bent as desired and near its middle lengthwise at point $c'$ twisted one-fourth turn. The upper end is formed with the edges of the bar in line with the cultivator and the lower end with the flat side forward and at the desired angle. This lower end may be provided with bolt holes for securing a removable point to same. Near its upper end is formed a pivotal hole by which the same is secured by a bolt $b$, to the bar of frame. The extreme end may be provided with several holes and a bolt $b'$ for securing the same to the frame and by means of which the teeth may be adjusted to different angles as is desired. The teeth are cut squarely across, that is, in a direction transverse to the frame, at the bottom, and the sides are concave, as shown in Fig. 3. The point which enters the ground therefore opens a furrow broader than that made by the central part of the teeth. The front end may be provided with an adjustable wheel D to regulate depth of cut.

By reason of the teeth presenting a flat inclined face to the soil to be cultivated and stirred up, they lift it up and break it into pieces instead of wedging themselves in between hard lumps and crushing same by side pressure as is the case where oval faced teeth are used, but in my invention the soil is lifted up by the incline of the teeth and then broken where there is nothing to resist its separation except its cohesion.

Having fully described my invention and its operations, what I claim as new, and desire to obtain by Letters Patent of the United States, is—

1. A cultivator frame having a central bar provided with a series of teeth in line with each other, so that all the succeeding teeth follow in the path of the first, the extreme teeth of said series being at the extreme front and rear of the harrow, and having side beams, each carrying a series of teeth, and adjustable laterally from the central bar, substantially as shown and described.

2. In a cultivator, the frame and teeth shanks secured thereto, and the teeth connected to said shanks, each tooth having parallel ends which are normally horizontal to the surface of the ground, and having concave sides, substantially as described.

3. The cultivator tooth having a perforated body for attachment to the frame, said body being twisted one to an angle of about ninety degrees, and having holes for the attachment of a removable point, in combination with the removable point which is nearly rectangular, with the sides slightly concave, all substantially as described.

WILLIAM HAMMER.

Witnesses:
LELIA BOYNTON,
E. C. MANTER.